United States Patent
Horio

(10) Patent No.: US 11,289,276 B2
(45) Date of Patent: Mar. 29, 2022

(54) POROUS METAL FOIL AND CAPACITOR ANODES MADE THEREFROM AND METHODS OF MAKING SAME

(71) Applicant: Global Advanced Metals Japan K.K., Tokyo (JP)

(72) Inventor: Isayuki Horio, Fukushima (JP)

(73) Assignee: GLOBAL ADVANCED METALS JAPAN K.K., Tokyo (JP)

(*) Notice: Subject to any disclaimer, the term of this patent is extended or adjusted under 35 U.S.C. 154(b) by 12 days.

(21) Appl. No.: 16/594,103

(22) Filed: Oct. 7, 2019

(65) Prior Publication Data
US 2020/0135410 A1    Apr. 30, 2020

Related U.S. Application Data

(60) Provisional application No. 62/752,431, filed on Oct. 30, 2018.

(51) Int. Cl.
| | | |
|---|---|---|
| *H01G 9/052* | (2006.01) | |
| *H01G 9/00* | (2006.01) | |
| *H01G 9/042* | (2006.01) | |

(52) U.S. Cl.
CPC ........... *H01G 9/052* (2013.01); *H01G 9/0029* (2013.01); *H01G 9/042* (2013.01)

(58) Field of Classification Search
CPC ...... H01G 9/052; H01G 9/0029; H01G 9/042; H01G 9/15
See application file for complete search history.

(56) References Cited

U.S. PATENT DOCUMENTS

| | | | |
|---|---|---|---|
| 4,067,736 A | 1/1978 | Vartanian | |
| 4,149,876 A | 4/1979 | Rerat | |
| 4,684,399 A | 8/1987 | Bergman et al. | |
| 5,234,491 A | 8/1993 | Chang | |
| 6,320,742 B1* | 11/2001 | Wada | H01G 9/15 361/528 |
| 6,328,927 B1 | 12/2001 | Lo et al. | |
| 6,582,641 B1 | 6/2003 | Lo et al. | |
| 6,770,154 B2 | 8/2004 | Koenigsmann et al. | |
| 7,081,148 B2 | 7/2006 | Koenigsmann et al. | |
| 8,168,118 B2 | 5/2012 | Michaluk et al. | |
| 10,943,744 B2* | 3/2021 | Sungail | H01G 9/00 |
| 2002/0172861 A1* | 11/2002 | Kimmel | C04B 35/495 429/218.1 |
| 2003/0090860 A1 | 5/2003 | Naito | |

(Continued)

FOREIGN PATENT DOCUMENTS

| | | |
|---|---|---|
| CN | 1539031 A | 10/2004 |
| CN | 101010160 A | 8/2007 |

(Continued)

OTHER PUBLICATIONS

Demcko et al., "Embedded Capacitor Technology: Options and Updates," Carts International 2014, 2014, 8 pages.

(Continued)

*Primary Examiner* — Dion R. Ferguson
(74) *Attorney, Agent, or Firm* — Kilyk & Bowersox, P.L.L.C.

(57) ABSTRACT

A porous metal foil and porous metal wire are described. Capacitor anodes made from either or both of the porous metal foil and porous metal wire are further described as well as methods to make same.

34 Claims, 1 Drawing Sheet

(Foil)

(Wire)

SEM Photos for Porous Structure

(56) References Cited

U.S. PATENT DOCUMENTS

| | | | | |
|---|---|---|---|---|
| 2004/0207973 | A1* | 10/2004 | Naito | H01G 9/055 |
| | | | | 361/509 |
| 2006/0070492 | A1 | 4/2006 | Qiu | |
| 2009/0109603 | A1* | 4/2009 | Nobuta | H01G 11/48 |
| | | | | 361/528 |
| 2011/0019340 | A1* | 1/2011 | Nobuta | H01B 1/127 |
| | | | | 361/525 |
| 2014/0198428 | A1* | 7/2014 | Yamazaki | H01G 9/028 |
| | | | | 361/525 |
| 2014/0268502 | A1* | 9/2014 | Biler | H01G 9/15 |
| | | | | 361/525 |
| 2014/0334069 | A1* | 11/2014 | Petrzilek | H01G 9/0036 |
| | | | | 361/524 |
| 2015/0047889 | A1* | 2/2015 | Asteman | C08L 71/02 |
| | | | | 174/260 |
| 2015/0250227 | A1* | 9/2015 | Kobal | A24B 15/30 |
| | | | | 131/290 |
| 2015/0279503 | A1* | 10/2015 | Scheel | H01L 51/441 |
| | | | | 361/529 |
| 2015/0292081 | A1 | 10/2015 | Hogan et al. | |
| 2015/0371785 | A1* | 12/2015 | Naito | H01G 9/07 |
| | | | | 361/524 |
| 2019/0272958 | A1* | 9/2019 | Sungail | H01G 11/00 |
| 2019/0333705 | A1* | 10/2019 | Sato | H01G 9/042 |

FOREIGN PATENT DOCUMENTS

| | | |
|---|---|---|
| CN | 104157455 A | 11/2014 |
| CN | 108588810 A | 9/2018 |
| JP | S61121320 A | 6/1986 |
| JP | 2007305780 A | 11/2007 |
| JP | 2009152273 A | 7/2009 |
| JP | 2011198873 A | 10/2011 |
| WO | 2008019992 A1 | 2/2008 |
| WO | 2015085203 A1 | 6/2015 |
| WO | 2018050473 A1 | 3/2018 |

OTHER PUBLICATIONS

Rataj et al., "Paste Technology for Next Generation of Ultra-thin Tantalum Capacitors," Carts International 2014, 2014, 7 pages.

Stolarski, C., "Ultra-Low Profile Capacitors," TIC Conference, Electronic Components Kemet Charged, Electronic Components Tokin A Kemet Company, 2017, 20 pages.

Stolarski et al., "Ultra-Low Profile Capacitors," T.I.C. Bulletin, 2017, pp. 11-19, No. 170.

International Search Report and Written Opinion issued in corresponding International Patent Application No. PCT/JP2019/042680 dated Jan. 15, 2020 (23 pages).

Chandrasekharan et al., "Thermal oxidation of tantalum films at various oxidation states from 300 to 700° C.", Journal of Applied Physics, American Institute of Physics, US, XP-012077983, 2005, pp. 114908-1 to 114908-10, vol. 98, No. 11.

Franklin, R. W., "Analysis of Solid Tantaum Capacitor Leakage Current", XP-055650390, 1996 (7 pages).

Upadhyaya, G. S., "Powder metallurgical processing and metal purity: A case for capacitor grade sintered tantalum", Bulletin of Materials Science., XP-055650301, 2005, pp. 305-307, vol. 28, No. 4.

Office Action issued in corresponding Chinese Patent Application No. 201980064465.4 dated Sep. 14, 2021 (21 pages).

\* cited by examiner

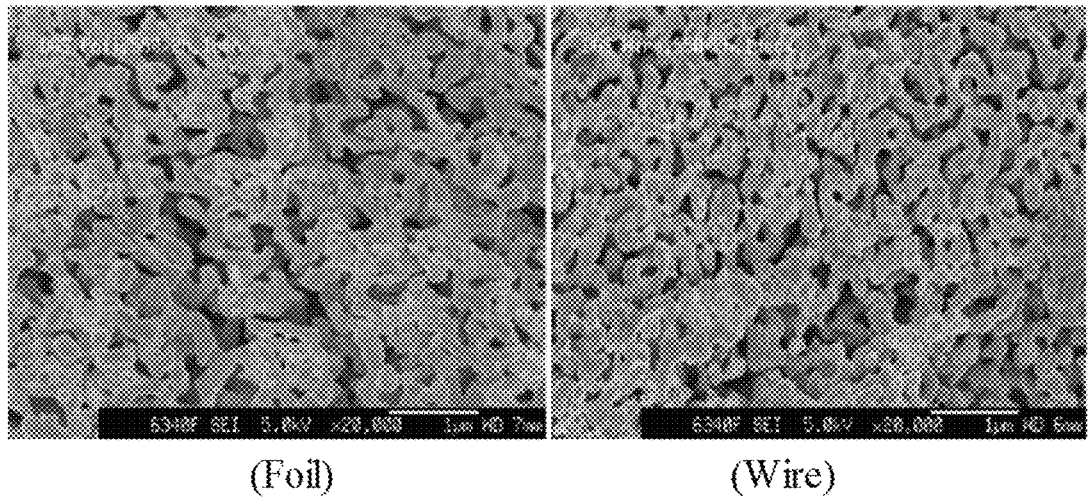
(Foil)  (Wire)
Figure 1, SEM Photos for Porous Structure
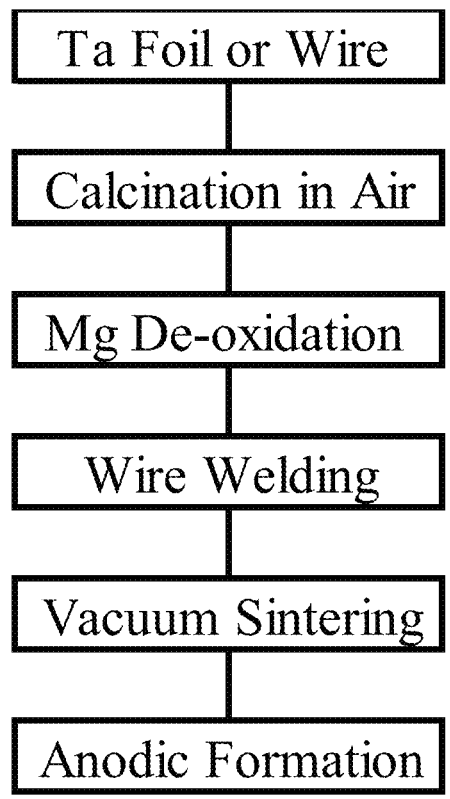
Figure 2, Flow Diagram

POROUS METAL FOIL AND CAPACITOR ANODES MADE THEREFROM AND METHODS OF MAKING SAME

This application claims the benefit under 35 U.S.C. § 119(e) of prior U.S. Provisional Patent Application No. 62/752,431, filed Oct. 30, 2018, which is incorporated in its entirety by reference herein.

BACKGROUND OF THE INVENTION

The present invention relates to metal foil and wire and anodes and capacitors containing same. In particular, the present invention relates to porous metal foil that includes tantalum foil.

The present invention further relates to methods of making the porous metal foil as well as methods of making anodes and capacitors that include the porous metal foil.

Among its many applications, valve metal powder, such as tantalum powder, is generally used to produce capacitor electrodes.

Currently, for example, tantalum powders are generally produced via one of two methods: a mechanical process or a chemical process. The mechanical process includes the steps of electron beam melting of tantalum to form an ingot, hydriding the ingot, milling the hydride, and then dehydriding, crushing, and heat treating. This process generally produces powder with high purity.

The other generally utilized process for producing tantalum powder is a chemical process. Several chemical methods for producing tantalum powders are known in the art. U.S. Pat. No. 4,067,736, issued to Vartanian, and U.S. Pat. No. 4,149,876, issued to Rerat, relate to the chemical production process involving sodium reduction of potassium fluorotantalate ($K_2TaF_7$). A review of typical techniques is also described in the background sections of U.S. Pat. No. 4,684,399, issued to Bergman et al., and U.S. Pat. No. 5,234,491, issued to Chang. All patents and publications are incorporated in their entirety by reference herein.

Tantalum powders produced by chemical methods, for example, are well-suited for use in capacitors because they generally have larger surface areas than powders produced by mechanical methods. The chemical methods generally involve the chemical reduction of a tantalum compound with a reducing agent. Typical reducing agents include hydrogen and active metals such as sodium, potassium, magnesium, and calcium. Typical tantalum compounds include, but are not limited to, potassium fluorotantalate ($K_2TaF_7$), sodium fluorotantalate ($Na_2TaF_7$), tantalum pentachloride ($TaCl_5$), tantalum pentafluoride ($TaF_5$), and mixtures thereof. The most prevalent chemical process is the reduction of $K_2TaF_7$ with liquid sodium.

In the chemical reduction of a valve metal powder, such as tantalum powder, potassium fluorotantalate is recovered, melted, and reduced to tantalum metal powder by sodium reduction. Dried tantalum powder can then be recovered, and optionally thermally agglomerated under vacuum to avoid oxidation of the tantalum and crushed. As the oxygen concentration of the valve metal material can be important in the production of capacitors, the granular powder typically is then deoxidized at elevated temperatures (e.g., up to about 1000° C. or higher) in the presence of a getter material, such as an alkaline earth metal (e.g., magnesium), that has a higher affinity for oxygen than the valve metal. A post-deoxidation process acid leaching conducted under normal atmospheric conditions (e.g., approximately 760 mm Hg) can be performed using a mineral acid solution including, for example, sulfuric acid or nitric acid, to dissolve metal and refractory oxide contaminants (e.g., magnesium and magnesium oxide contaminants) before the material is further processed. The acid leached powders are washed and dried, and may then be compressed, sintered, and anodized in conventional manners to make sintered porous bodies, such as anodes for capacitors.

Most of the efforts in developing tantalum powders has been driven by the capacitor anode industry, where powders were made for this specific purpose only.

As technology progresses and electrical devices become smaller and smaller, there is a desire to provide anodes that are capable of being utilized in such small or miniature devices. Many anodes today, as indicated above, are created by taking tantalum powder and pressing the powder into an anode shape and sintering the anode to form a sintered body that is then anodized in an electrolyte to form a dielectric oxide film on the sintered body to ultimately form the capacitor anode. The difficulty arises because with the press and sinter method using starting tantalum powder, the anode can only be made so small. Therefore, it is generally understood that by using the traditional press and sinter methods, an acceptable anode thinner than 0.2 mm is extremely difficult to obtain.

Accordingly, there is a need in the industry to provide acceptable anodes that can consistently be of thin thicknesses so as to be able to form an anode that is thinner than 0.2 mm in thickness.

SUMMARY OF THE PRESENT INVENTION

A feature of the present invention is to provide porous metal foil that can be utilized in forming thin capacitor anodes.

Another feature of the present invention is to provide anodes and capacitors made from the porous metal foil.

An additional feature of the present invention is to provide a method to form a porous metal foil that can be utilized in anode manufacturing.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention in part relates to a porous metal foil. The porous metal foil has a thickness and an outer surface. The porous metal foil or porous metal wire comprises or includes or is a tantalum foil having a nominal thickness of 0.2 mm or less or has a diameter of from about 0.05 mm to about 1.0 mm. The porous metal foil or porous metal wire further has porosity at least on the outer surface of the metal foil or metal wire.

The present invention further relates to a capacitor anode that includes or is formed from the porous metal foil of the present invention and a dielectric oxide film formed on the porous metal foil.

The present invention also relates to a method to form the porous foil of the present invention that includes subjecting a metal foil that comprises or is tantalum to an oxidation treatment that forms an oxide layer on the metal foil. The method then further includes subjecting this metal foil to a de-oxidation treatment so as to form porosity on at least of a surface of the metal foil.

It is to be understood that both the foregoing general description and the following detailed description are exemplary and explanatory only and intended to provide a further explanation of the present invention, as claimed.

BRIEF DESCRIPTION OF DRAWINGS

FIG. 1 are SEM photographs of the foil and wire formed in the present invention and show the porous structure present. Particularly, as shown in the SEM photographs, etched surfaces are shown that resemble particulate-like exposed surfaces.

FIG. 2 is a flow chart showing one example of the process that can be utilized in the present invention.

DETAILED DESCRIPTION OF THE PRESENT INVENTION

The present invention relates to a porous metal foil or porous metal wire. Further, the present invention relates to a capacitor anode that includes or is formed from the porous metal foil and/or porous metal wire. In addition, the present invention relates to methods to form the porous metal foil or porous metal wire of the present invention. The present invention further relates to other aspects as described herein.

In more detail, the porous metal foil or porous metal wire of the present invention has a thickness and outer surface (i.e., exterior surface or exposed surface). The porous metal foil includes, comprises, consists essentially of, consists of, or is a tantalum foil having a nominal thickness. This thickness can be for instance, 0.2 mm or less. Further, the porous metal foil has porosity at least on the outer surface.

Regarding the thickness of the metal foil or the thickness of the tantalum foil, as stated, this thickness can be 0.2 mm or less or other thicknesses. For instance, the thickness can be from 0.01 mm to 0.2 mm, or 0.02 mm to 0.2 mm, or from 0.012 mm to 0.2 mm, or from 0.025 mm to 0.15 mm, or from 0.05 mm to 0.1 mm, or from 0.04 mm to 0.1 mm, or from 0.015 mm to 0.09 mm, and other thicknesses within or outside of these ranges.

For purposes of the present invention, the metal foil can be considered a metal ribbon or metal strip that has the thicknesses described herein. For purposes of the present invention, the tantalum foil can be considered a tantalum ribbon or tantalum strip that has the thicknesses described herein. The metal foil such as the tantalum foil can be a powder met grade or an ingot derived grade (e.g., electron beam (EB) grade). The metal foil such as tantalum foil (or starting metal foil such as starting tantalum foil) is commercially available from a number of suppliers, including Global Advanced Metals USA, Alfa Aesar, and H.C. Starck.

The porous metal foil of the present invention can have a metal purity that can be at least 99.9% Ta (by weight) (excluding gases). This purity can be for instance at least 99.95% Ta, or at least 99.99% Ta, or for instance from about 99.9% Ta to 99.995% Ta or higher.

As an option, the porous metal foil can have a carbon content or carbon amount of less than 200 ppm, for instance, less than 100 ppm, or less than 50 ppm, or less than 25 ppm. For instance, the carbon amount or content in the porous metal foil can be from about 5 ppm to about 199 ppm with respect to carbon (elemental form) or from about 10 ppm to 175 ppm, or from about 15 ppm to 150 ppm, or from about 25 ppm to 150 ppm carbon (elemental form).

The porous metal foil can have the above-mentioned purity level with respect to tantalum in combination with any one of these carbon content or amount ranges.

The porous metal foil of the present invention further has porosity as indicated herein. This porosity is at least on the outer surface. The porosity on the outer surface can be uniform or non-uniform. The porosity can be understood to be a plurality of pores and/or craters.

The porosity of the metal foil can be not only at or on the outer surface but can be, as an option, below the surface (e.g., within the foil or the interior of the foil). This porosity, if below the outer surface (e.g., within the thickness of the porous metal foil) can be throughout the thickness or through certain regions or portions of the thickness. The porosity beneath the outer surface can be uniform or non-uniform. The depth of any porosity that is below the outer surface can be even or uneven with respect to the location of the porosity from the outer surface. Put another way, and as an example, porosity may exist in part of the metal foil at a depth of 5 microns from the outer surface, but not be present at some other part at the same depth of 5 microns.

With the present invention, and due to the porosity that is formed, the exposed surface has 'islands' of solid metal that appear as primary particles or agglomerated particles. The exposed surface and the particle-like appearance can be considered etched particulate exposed surfaces or can be considered etched exposed surfaces that appear as particulates or agglomerated particulates. These etched particulate exposed surfaces can have sizes that can be quantified or measured like primary particle sizes.

Accordingly, the metal foil can have particulate (or particulate-like) exposed sizes (at an exposed surface such as shown in FIG. 1) of from about 5 nm to about 500 nm, for instance from about 5 nm to about 400 nm, from about 5 nm to about 300 nm, from about 5 nm to about 200 nm, from about 10 nm to about 500 nm, from about 20 nm to about 500 nm, from about 50 nm to about 500 nm, from about 50 nm to about 400 nm, from about 50 nm to about 300 nm, from about 50 nm to about 200 nm, or other ranges within or outside of these ranges. Each of these ranges provided here can be an average particle size for the particulate-like surfaces that are at the exposed surface of the foil.

With the present invention, from the formation of the porosity at least at a exposed surface or more than one exposed surface and generally at the two surfaces that are exposed (the top and bottom surfaces and not the edges of a foil), the surface area at that surface or all surfaces is increased by at least 25% in area, at least 50%, at least 75%, at least 100%, at least 125% or at least 150% (such as from about 25% to 150% increase in exposed surface area) compared to a starting metal foil that is not subjected to a method of the present invention that forms the porous metal foil of the present invention. The increase in surface area can be a BET ($m^2/g$) measurement or other external surface area measurement that measures total surface area.

The porous metal foil of the present invention can have porosity present, based on volume of the overall metal foil, such that porosity is present in an amount of 100% by volume or less, 75% by volume or less, 50% by volume or less, 30% by volume or less, 20% by volume or less, such as from about 1% by volume to about 100% by volume, from about 5% by volume to about 75% by volume, from about 5% by volume to about 50% by volume, from about 5% by volume to about 30% by volume, from about 2% by volume to about 20% by volume and the like. As stated, with respect to any porosity that is present by this volume percent, the porosity can be uniform or non-uniform where present in the porous metal foil.

Generally, the porosity at the outer surface is present in a greater amount (e.g., number of pores and/or density of porosity) than any porosity beneath or below the outer surface if at all present. For instance, the porosity on the outer surface can be the same or can be at least 10% higher in the amount of porosity compared to any region beneath the outer surface. For instance, this porosity can be at least 20% greater, at least 50% greater, at least 75% greater, at least 100% greater, at least 150% greater, at least 200% greater with respect to the number of pores present at the outer surface compared to any region beneath the outer surface or in the interior of the metal foil. The porosity from the surface to the interior can be a gradient, wherein the degree of porosity and/or uniformity of porosity decreases going from the outer surface to the interior.

As another option, the porosity below the outer surface or in the interior of the metal foil can optionally be at a level that is at least 5 microns below the outer surface. For instance, this level where porosity is present can be at a level of at least 10 microns below the outer surface, at least 25 microns below the outer surface, at least 50 microns below the outer surface, or at least 100 microns below the outer surface or other depth amounts. Any porosity below the outer surface can be uniform or non-uniform and/or be evenly present at a certain depth or not be evenly present at a certain depth. For instance, and strictly as an example, porosity can be present in one region of the porous metal foil at a certain depth but not be present in another region at that same depth. This would be one example of non-uniform porosity being present especially below the surface. Another example is that the density of porosity may be the same or different in one region at a certain depth compared to another region at that same depth.

The porous metal foil of the present invention can have any length, any width, and as stated a nominal thickness generally of 0.2 mm or less. For instance, the length of the metal foil can be from about 10 mm to about 50 mm or other amounts within or outside of this upper or lower range. The porous metal foil can have a width of from about 5 mm to about 25 mm or other widths within or outside of this upper or lower range.

The porous metal wire having a diameter and outer surface comprises, includes, consists essentially of, consists of, or is a tantalum wire that has porosity. This starting metal wire such as the starting tantalum wire to make the wire of the present invention is commercially available from the same sources as the metal foil mentioned here. With regard to the porous metal wire, the porous metal wire of the present invention has the same features and characteristics as described herein for the porous metal foil with respect to porosity. The discussion herein regarding the features, characteristics, and properties, regarding porosity for the metal foil apply equally to this porous metal wire embodiment. The discussion regarding the tantalum and its purity regarding the porous metal foil apply equally here to the porous metal wire embodiment and each of these are incorporated for this wire embodiment to avoid repetition.

The porous metal wire of the present invention, as stated, has an outer surface and has a diameter that can be from about 0.05 mm to about 1.0 mm. This diameter can be from about 0.05 mm to about 0.75 mm or from about 0.05 mm to about 0.5 mm or other diameters within or outside of any one of these ranges. The porous metal wire can have any length. While the term "diameter" generally denotes a circular cross-sectional shape, it is understood that if the cross-sectional shape is rectangular or other such geometrical shapes, the term diameter encompasses these other shapes and the diameter would then represent a cross-sectional length and/or width parameter for these other shapes.

The porous metal foil of the present invention can be utilized or formed into a capacitor anode. The capacitor anode comprises, includes, consists essentially of, consists of, or is the porous metal foil of the present invention. The capacitor anode further includes a dielectric oxide film or layer present or formed on the porous metal foil. The porous metal foil that forms the capacitor anode can be a sintered porous metal foil.

Furthermore, the present invention relates to a capacitor that includes the capacitor anode of the present invention.

The capacitor anode of the present invention can include the porous metal wire of the present invention and this can be used as for the capacitor anode and/or capacitor of the present invention.

The present invention further relates to methods of forming the porous metal foil and/or porous metal wire of the present invention.

The method of forming the porous metal foil or porous metal wire of the present invention can comprise, include, consist essentially of, or consist of subjecting a metal foil to an oxidation treatment that forms an oxide layer on at least a surface of the metal foil. The method further includes the step of subjecting the metal foil, after the oxidation treatment, to a de-oxidation treatment so as to form porosity on at least the surface of the metal foil or wire. As indicated, the porosity can be formed on at least one outer surface, several outer surfaces, or all outer surfaces, and can optionally include one or more interior regions or depths below the surface as described earlier. FIG. 2 shows a summary of these steps.

In the method of the present invention, the step of subjecting the metal foil to an oxidation treatment can be repeated one or more times. For instance, the oxidation treatment step can be repeated once, twice, three times, or from one to ten times or more. The conditions for each step, if repeated, can be the same or different from other oxidation treatment steps.

The de-oxidation treatment step can be repeated one or more times. For instance, this step can be repeated at least once, or at least twice, or at least three times, or from one to ten or more times. The conditions for each of the de-oxidation treatment steps (when repeated) can be the same or different from a previous de-oxidation treatment step.

As an option, the oxidation treatment step and the de-oxidation treatment step can each be repeated one or more times.

Regarding the oxidation treatment, this step(s) can comprise, include, consist essentially of, consist of, or be a calcination of the metal foil in air at a temperature that causes oxidation of the metal foil. For instance, the temperature can be at least 500° C. The oxidation treatment can be for at least five minutes or more, such as from five minutes to ten hours or more. Thus, one example of an oxidation treatment is a calcination of the metal foil in air at a temperature of at least 500° C. for at least five minutes. For instance, the calcination in air can be at a temperature of from about 500° C. to about 650° C. for a time of from about five minutes to about ten hours or more.

The oxidation treatment(s) can be, includes, comprises, consists essentially of, or consists of a chemical oxidation treatment. An example of a chemical oxidation treatment is one that uses acid, such as HF acid, for instance at elevated temperatures (e.g., at a temperature of from 40° C. to 600°

C. A chemical oxidation treatment can be one that uses an alkaline bath at elevated temperatures (e.g., at a temperature of from 40° C. to 600° C.).

Regarding the oxidation treatment which forms the oxide layer on the metal foil, this oxidation treatment can form an oxide layer that has a thickness of at least 1 micron or a thickness of at least 5 microns or a thickness of at least 10 microns or a thickness of at least 50 microns and the like.

As an option, the oxidation treatment can cause oxidation of the foil on 50% by total volume or less, 40% by volume or less, 30% by volume or less, 20% by volume or less, 10% by volume or less with regard to the overall volume of the metal foil or metal wire.

With regard to the de-oxidation treatment, this step can comprise, include, consist essentially of, consist of, or be a step which subjects the metal foil (that was subjected to an oxidation treatment(s)) to an oxygen getter material at a temperature that is elevated. For instance, this temperature can be at least 500° C. The amount of time that the metal foil is subjected to an oxygen getter can be at least 5 minutes. For instance, and strictly as an example, the de-oxidation treatment can include or is the step of subjecting the metal foil to an oxygen getter material at a temperature of at least about 500° C. for a time of from about 5 minutes to about ten hours or more. For instance, the temperature can be from about 600° C. to 1300° C., or from about 700° C. to 1300° C., or from about 700° C. to about 1200° C., or from about 700° C. to about 1000° C.

As an option, after the de-oxidation step(s), the metal foil can then optionally be subjected to a sintering, such as a vacuum sintering. The sintering temperature can be from about 1000° C. to about 1600° C. The amount of time for the sintering can be from about 5 minutes to about 10 hours.

As an option, the metal foil after the de-oxidation treatment(s) can be subjected to an acid leach (e.g., HNO3) and then water rinsed and then dried.

As an option, the oxidation treatment(s) and de-oxidation treatment(s) can occur without any annealing in between the oxidation treatment and the de-oxidation treatment.

As an option, to form the capacitor anode of the present invention, the metal foil can be anodized in an electrolyte to form a dielectric oxide film or layer on the metal foil.

The capacitor anode of the present invention can have a current leakage of 10 nA/uFV or lower. This leakage can be, for instance, 5 nA/uFV or lower or 1 nA/uFV or lower, from about 0.1 nA/uFV to about 10 nA/uFV, or from about 0.1 nA/uFV to about 5 nA/uFV, or from about 0.1 nA/uFV to about 1 nA/uFV.

The present invention will be further clarified by the following examples, which are intended to be exemplary of the present invention.

EXAMPLES

Example 1

In this example, a porous metal foil and wire were made following the present invention.

A commercially available starting tantalum foil produced by Global Advanced Metals, KK was used having a 0.07 mm thickness. This foil was cut into dimensions so that each foil piece had a 10 mm width with a 50 mm length. The tantalum foil was then acid leached in 30% $HNO_3$ and rinsed in deionized water and then dried.

Furthermore, a starting tantalum wire having a 0.5 mm diameter was cut to a 350 mm length and wound into a spring shape and then rinsed in acetone and dried. This starting capacitor grade tantalum wire was made by Global Advanced Metals, USA.

There were multiple pieces of the tantalum foil used in experiments and there were multiple pieces of diameter wire used in experiments. Some of the tantalum foil and some of the tantalum wire were preliminarily subjected to chemical oxidation in a molten KOH bath at approximately 500° C. for 5 minutes, rinsed in deionized water, and dried. This treatment is identified in the Tables as "DGS."

All of the samples were then placed in a ceramic bowl and subjected to one of the following treatments:

a) 550° C. for 30 minutes b) 600° C. for 30 minutes c) 550° C. for 120 minutes d) 570° C. for 120 minutes or e) no air calcination at all.

Furthermore, some of the samples were then vacuum annealed at 1400° C. for 20 minutes as an option.

Afterwards, all of the samples were subjected to a de-oxidation treatment that involved using magnesium chips. Particularly, 8 grams of magnesium chips were placed in the bottom of a tantalum box, in which dimensions were 100 mm in length, 60 mm in width, and 25 mm in height, and the samples of tantalum foil and tantalum wire were placed over the magnesium chips and covered with a lid and subjected to either 750° C. or 980° C. for a total of approximately 5 hours. Some of this time involved an argon atmosphere. After cooling, air passivation was carried out by repeated cycles of vacuum pumping and air introduction.

Afterwards, the material subjected to the de-oxidation was acid leached using $HNO_3$ (60% concentration). The materials were then rinsed in deionized water and dried. This de-oxidation treatment was repeated twice using the same conditions.

For anode formation, a 60 mm length of 0.5 mm diameter wire was welded to the specimen, and the tantalum foil and wire was subjected to vacuum sintering at 1200° C. for 20 minutes.

For anode formation, a 20 volt formation was used involving 0.1 volume % $H_3PO_4$ at 60° C. for 120 minutes wherein the current density to target Vf was 20 µA/mm$^2$. Afterwards, the electrical properties were measured.

The electrical measurements in liquid electrolyte was performed in 30 volume % $H_2SO_4$ for capacitance with 120 Hz and Bias of 1.5 volts at 25° C. and in 10 volume % $H_3PO_4$ for DC leakage with a 14 volt by three minute charge at 25° C.

The results of the experiments are set forth in the following tables.

TABLE 1

| Starting material | Foil | Foil | DGS Foil | DGS Foil | Foil | DGS Foil | DGS Foil | DGS Foil | DGS Foil | Foil | DGS Foil | Wire | DGS Wire | DGS Wire | DGS Wire | DGS Wire |
|---|---|---|---|---|---|---|---|---|---|---|---|---|---|---|---|---|
| Calcination | No | No | No | No | 550/ | 550/ | 550/.5 h | 550/2 h | 550/2 h | 600/.5 h | 600/.5 h | No | 550/2 h | 550/2 h | 570/2 h | 570/2 h |

TABLE 1-continued

| Starting material | Foil | Foil | DGS Foil | DGS Foil | Foil | DGS Foil | DGS Foil | DGS Foil | DGS Foil | Foil | DGS Foil | Wire | DGS Wire | DGS Wire | DGS Wire | DGS Wire |
|---|---|---|---|---|---|---|---|---|---|---|---|---|---|---|---|---|
| (° C./time) | | | | | .5 h | .5 h | | | | | | | | | | |
| Deox (° C.) | No | 750 | 750 | 980 | 980 | 750 | 980 | 980 | 980 × 2 | 980 | 980 | No | 980 | 980 × 2 | 980 | 980 × 2 |
| CV/cc (mFV/cc) | 4 | 3 | 3 | 4 | 12 | 9 | 11 | 122 | 160 | 179 | 177 | 1 | 120 | 80 | 231 | 128 |

TABLE 2

| Starting material | Foil | Foil | DGS Foil | DGS Foil | Foil | DGS Foil | DGS Foil | DGS Foil | DGS Foil | Foil | DGS Foil | Wire | DGS Wire | DGS Wire | DGS Wire | DGS Wire |
|---|---|---|---|---|---|---|---|---|---|---|---|---|---|---|---|---|
| Calcination (° C./time) | No | No | No | No | 550/.5 h | 550/.5 h | 550/.5 h | 550/2 h | 550/2 h | 600/.5 h | 600/.5 h | No | 550/2 h | 550/2 h | 570/2 h | 570/2 h |
| Deox (° C.) | No | 750 | 750 | 980 | 980 | 750 | 980 | 980 | 980 × 2 | 980 | 980 | No | 980 | 980 × 2 | 980 | 980 × 2 |
| LC/CV (nA/uFV) | 42.3 | 32.5 | 7.8 | 12.7 | 5.6 | 10.4 | 5.8 | 1.5 | 0.3 | 1.2 | 1.3 | 14.7 | 0.3 | 1.1 | 1.1 | 1.7 |

By visual observation and in view of the electrical properties as shown above, a porous structure was at least directly formed on the surface of the foil and wire by using the oxidation and de-oxidation treatments of the present invention. In these examples, a thin anode material of less than 0.1 mm thickness was obtained and this anode had sufficient capacitance and DC leakage properties for commercially viability for uses in small devices especially.

The present invention includes the following aspects/embodiments/features in any order and/or in any combination:

1. A porous metal foil having a thickness and outer surface, said porous metal foil or wire comprising a) a tantalum foil having a nominal thickness of 0.2 mm or less or a diameter of from about 0.05 mm to about 1.0 mm, and b) porosity at least at said outer surface.
2. The porous metal foil of any preceding or following embodiment/feature/aspect, wherein said nominal thickness is 0.01 mm to 0.2 mm.
3. The porous metal foil of any preceding or following embodiment/feature/aspect, wherein said diameter is 0.05 mm to 0.5 mm.
4. The porous metal foil of any preceding or following embodiment/feature/aspect, wherein said nominal thickness is 0.02 mm to 0.18 mm.
5. The porous metal foil of any preceding or following embodiment/feature/aspect, wherein said nominal thickness is 0.03 mm to 0.18 mm.
6. The porous metal foil of any preceding or following embodiment/feature/aspect, wherein said porous metal foil has a purity level of at least 99.9% Ta.
7. The porous metal foil of any preceding or following embodiment/feature/aspect, wherein said porous metal foil has a purity level of at least 99.9% Ta and a carbon amount of less than 200 ppm.
8. The porous metal foil of any preceding or following embodiment/feature/aspect, wherein said porous metal foil has a purity level of at least 99.9% Ta and a carbon amount of less than 100 ppm.
9. The porous metal foil of any preceding or following embodiment/feature/aspect, wherein said porous metal foil has a purity level of at least 99.9% Ta and a carbon amount of from about 5 ppm to about 100 ppm.
10. The porous metal foil of any preceding or following embodiment/feature/aspect, wherein etched particulate exposed surfaces have an average particle size of from about 5 nm to about 500 nm.
11. The porous metal foil of any preceding or following embodiment/feature/aspect, wherein etched particulate exposed surfaces have an average particle size of from about 50 nm to about 200 nm.
12. The porous metal foil of any preceding or following embodiment/feature/aspect, wherein said porosity is further present at a level of at least 5 microns below said outer surface.
13. The porous metal foil of any preceding or following embodiment/feature/aspect, wherein said porosity is further present at a level of at least 10 microns below said outer surface.
14. The porous metal foil of any preceding or following embodiment/feature/aspect, wherein said porosity is further present at a level of at least 50 microns below said outer surface.
15. The porous metal foil of any preceding or following embodiment/feature/aspect, wherein said metal foil has a length of from 10 mm to 50 mm, a width of from 5 mm to 25 mm, and a nominal thickness of from 0.01 mm to 0.2 mm.
16. A capacitor anode comprising said porous metal foil of any preceding or following embodiment/feature/aspect and a dielectric oxide film on said porous metal foil.
17. The capacitor anode of any preceding or following embodiment/feature/aspect, wherein said porous metal foil is a sintered porous metal foil.
18. A capacitor comprising the capacitor anode of any preceding or following embodiment/feature/aspect.
19. A method to form the porous metal foil of any preceding or following embodiment/feature/aspect, said method comprising
  a. subjecting a metal foil to an oxidation treatment that forms an oxide layer on said metal foil,
  b. subjecting the metal foil of step a) to a de-oxidation treatment to form porosity on at least a surface of said metal foil.
20. The method of any preceding or following embodiment/feature/aspect, wherein said step b) is repeated one or more times after said step a).

21. The method of any preceding or following embodiment/feature/aspect, wherein said step a) is repeated one or more times and step b) is repeated one or more times.
22. The method of any preceding or following embodiment/feature/aspect, wherein said oxidation treatment comprises a calcination of the metal foil in air at a temperature of at least 500° C. for at least 5 minutes.
23. The method of any preceding or following embodiment/feature/aspect, wherein said oxidation treatment comprises a calcination of the metal foil in air at a temperature of from about 500° C. to about 650° C. for a time of from about 5 minutes to about 10 hours.
24. The method of any preceding or following embodiment/feature/aspect, further comprising vacuum sintering of said metal foil after step b).
25. The method of any preceding or following embodiment/feature/aspect, wherein said oxidation treatment comprises a chemical oxidation treatment.
26. The method of any preceding or following embodiment/feature/aspect, wherein said de-oxidation treatment comprises subjecting said metal foil of step a) to an oxygen getter material at a temperature of at least 500° C. for at least 5 minutes.
27. The method of any preceding or following embodiment/feature/aspect, wherein said de-oxidation treatment comprises subjecting said metal foil of step a) to an oxygen getter material at a temperature of from about 700° C. to about 1300° C. for a time of from about 5 minutes to about 10 hours.
28. The method of any preceding or following embodiment/feature/aspect, further comprising, after step b), subjecting said metal foil to an acid leach and then water rinse and then drying.
29. The method of any preceding or following embodiment/feature/aspect, further comprising, after step b), sintering said metal foil and then anodizing the metal foil in an electrolyte to form a dielectric oxide film on the metal foil to form a capacitor anode.
30. The method of any preceding or following embodiment/feature/aspect, wherein said oxidation treatment forms said oxide layer having a thickness of at least 5 microns.
31. The method of any preceding or following embodiment/feature/aspect, wherein said oxidation treatment forms said oxide layer having a thickness of at least 10 microns.
32. The method of any preceding or following embodiment/feature/aspect, wherein said oxidation treatment forms said oxide layer having a thickness of at least 50 microns.
33. The capacitor anode of any preceding or following embodiment/feature/aspect, wherein said capacitor anode has a current leakage of 10 nA/uFV or lower.
34. The capacitor anode of any preceding or following embodiment/feature/aspect, wherein said capacitor anode has a current leakage of from 0.1 nA/uFV to 1.0 nA/uFV.
35. The method of any preceding or following embodiment/feature/aspect, wherein said oxidation treatment and said de-oxidation treatment occur without any annealing in between.

The present invention can include any combination of these various features or embodiments above and/or below as set forth in sentences and/or paragraphs. Any combination of disclosed features herein is considered part of the present invention and no limitation is intended with respect to combinable features.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A porous metal foil having a thickness and outer surface, said porous metal foil comprising a) a tantalum foil having a nominal thickness of 0.2 mm or less, and b) porosity at least at said outer surface and as part of the tantalum foil, and wherein said porous metal foil has a purity level of at least 99.9% Ta and a carbon amount of less than 200 ppm.

2. The porous metal foil of claim 1, wherein said porous metal foil consists of said tantalum foil, and having said nominal thickness that is 0.01 mm to 0.2 mm.

3. The porous metal foil of claim 1, wherein said tantalum foil having said nominal thickness that is 0.02 mm to 0.18 mm.

4. The porous metal foil of claim 1, wherein said tantalum foil having said nominal thickness that is 0.03 mm to 0.18 mm.

5. The porous metal foil of claim 1, wherein said carbon amount is from 5 ppm to 25 ppm.

6. The porous metal foil of claim 1, wherein said purity level is at least 99.99% Ta and said carbon amount is less than 50 ppm.

7. The porous metal foil of claim 1, wherein said carbon amount is less than 100 ppm.

8. The porous metal foil of claim 1, wherein said carbon amount is from about 5 ppm to about 100 ppm.

9. The porous metal foil of claim 1, wherein said outer surfaces comprise pores and exposed particulate-like surfaces, wherein said particulate-like surfaces have an average primary particle size of from about 5 nm to about 500 nm.

10. The porous metal foil of claim 1, wherein said outer surfaces comprise pores and exposed particulate-like surfaces, wherein said particulate-like surfaces have an average primary particle size of from about 50 nm to about 200 nm.

11. The porous metal foil of claim 1, wherein said porosity is further present at a level of at least 5 microns below said outer surface.

12. The porous metal foil of claim 1, wherein said porosity is further present at a level of at least 10 microns below said outer surface.

13. The porous metal foil of claim 1, wherein said porosity is further present at a level of at least 50 microns below said outer surface.

14. The porous metal foil of claim 1, wherein said metal foil has a length of from 10 mm to 50 mm, a width of from 5 mm to 25 mm, and a nominal thickness of from 0.01 mm to 0.2 mm.

15. A capacitor anode comprising said porous metal foil of claim 1 and a dielectric oxide film on said porous metal foil.

16. The capacitor anode of claim 15, wherein said porous metal foil is a sintered porous metal foil.

17. A capacitor comprising the capacitor anode of claim 15.

18. A method to form the porous metal foil of claim 1, said method comprising
   a. subjecting a metal foil to an oxidation treatment that forms an oxide layer on said metal foil,
   b. subjecting the metal foil of step a) to a de-oxidation treatment to form porosity on at least a surface of said metal foil.

19. The method of claim 18, wherein said step b) is repeated one or more times after said step a).

20. The method of claim 18, wherein said step a) is repeated one or more times and step b) is repeated one or more times.

21. The method of claim 18, wherein said oxidation treatment comprises a calcination of the metal foil in air at a temperature of at least 500° C. for at least 5 minutes.

22. The method of claim 18, wherein said oxidation treatment comprises a calcination of the metal foil in air at a temperature of from about 500° C. to about 650° C. for a time of from about 5 minutes to about 10 hours.

23. The method of claim 18, further comprising vacuum sintering of said metal foil after step b).

24. The method of claim 18, wherein said oxidation treatment comprises a chemical oxidation treatment.

25. The method of claim 18, wherein said de-oxidation treatment comprises subjecting said metal foil of step a) to an oxygen getter material at a temperature of at least 500° C. for at least 5 minutes.

26. The method of claim 18, wherein said de-oxidation treatment comprises subjecting said metal foil of step a) to an oxygen getter material at a temperature of from about 700° C. to about 1300° C. for a time of from about 5 minutes to about 10 hours.

27. The method of claim 18, further comprising, after step b), subjecting said metal foil to an acid leach and then water rinse and then drying.

28. The method of claim 18, further comprising, after step b), sintering said metal foil and then anodizing the metal foil in an electrolyte to form a dielectric oxide film on the metal foil to form a capacitor anode.

29. The method of claim 18, wherein said oxidation treatment forms said oxide layer having a thickness of at least 5 microns.

30. The method of claim 18, wherein said oxidation treatment forms said oxide layer having a thickness of at least 10 microns.

31. The method of claim 18, wherein said oxidation treatment forms said oxide layer having a thickness of at least 50 microns.

32. The capacitor anode of claim 15, wherein said capacitor anode has a current leakage of 10 nA/uFV or lower.

33. The capacitor anode of claim 15, wherein said capacitor anode has a current leakage of from 0.1 nA/uFV to 1.0 nA/uFV.

34. The method of claim 18, wherein said oxidation treatment and said de-oxidation treatment occur without any annealing in between.

\* \* \* \* \*